March 3, 1964 H. MEHLHORN 3,123,669

TELEVISION RECEIVER TUNING INDICATOR

Filed Oct. 12, 1960 3 Sheets-Sheet 1

INVENTOR
HELMUT MEHLHORN

BY Frank R. Trifari
AGENT

INVENTOR
HELMUT MEHLHORN
BY Frank R. Trifari
AGENT

INVENTOR
HELMUT MEHLHORN

BY [signature]
AGENT 3,123,669

TELEVISION RECEIVER TUNING INDICATOR

Helmut Mehlhorn, Krefeld-Oppum, Germany, assignor to North American Philips Company, Inc., New York, N.Y., a corporation of Delaware Filed Oct. 12, 1960, Ser. No. 62,223
Claims priority, application Germany Nov. 6, 1959
6 Claims. (Cl. 178—7.5)

This invention relates to a television receiver having a circuit arrangement for tuning indication on the screen of a picture tube, provided with a frequency discriminator which supplies a control signal dependent on the tuning of the receiver, which signal disappears when the exact tuning is reached, by means of which control signal the phase of a deflection oscillator with respect to the synchronisation pulses, with which this deflection oscillation is synchronised, and/or the amplitude thereof is varied.

Such a receiver is known from the Belgian patent specification 573,514. In this case, however, each time a switch has to be pressed to find out whether the picture is still shifting or not so as to be able to establish the exact tuning of the receiver. This is cumbersome and, in addition, has the drawback that by pressing the switch also in the case of the exact tuning a small movement in the picture is possible all the same which is wrongly interpreted by the viewer.

In the receiver according to the invention, these drawbacks are removed and this receiver is characterized in that a pulsatory signal, derived from the field deflection generator in the receiver and having a frequency which is equal to $\frac{1}{2}n$ times the field frequency ($n=1, 2, 3,$ etc.), is supplied to the frequency discriminator with a releasing polarity.

A great advantage is that by the measures according to the invention a special unsharp or distorted picture is obtained in the case of the wrong tuning, while this special lack of definition or distortion disappears entirely in the case of the exact tuning.

Figure 1:
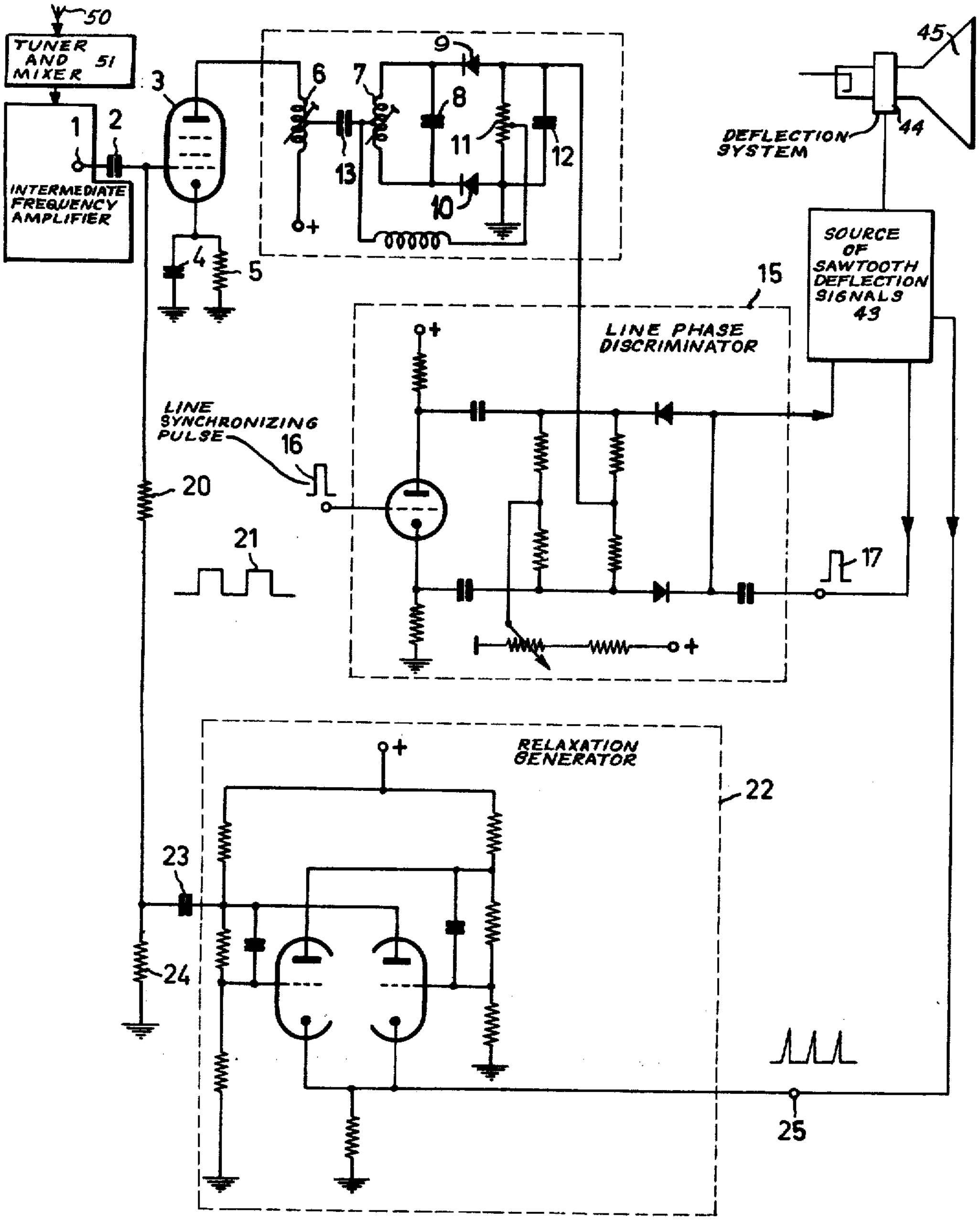
Figures 2, 3:
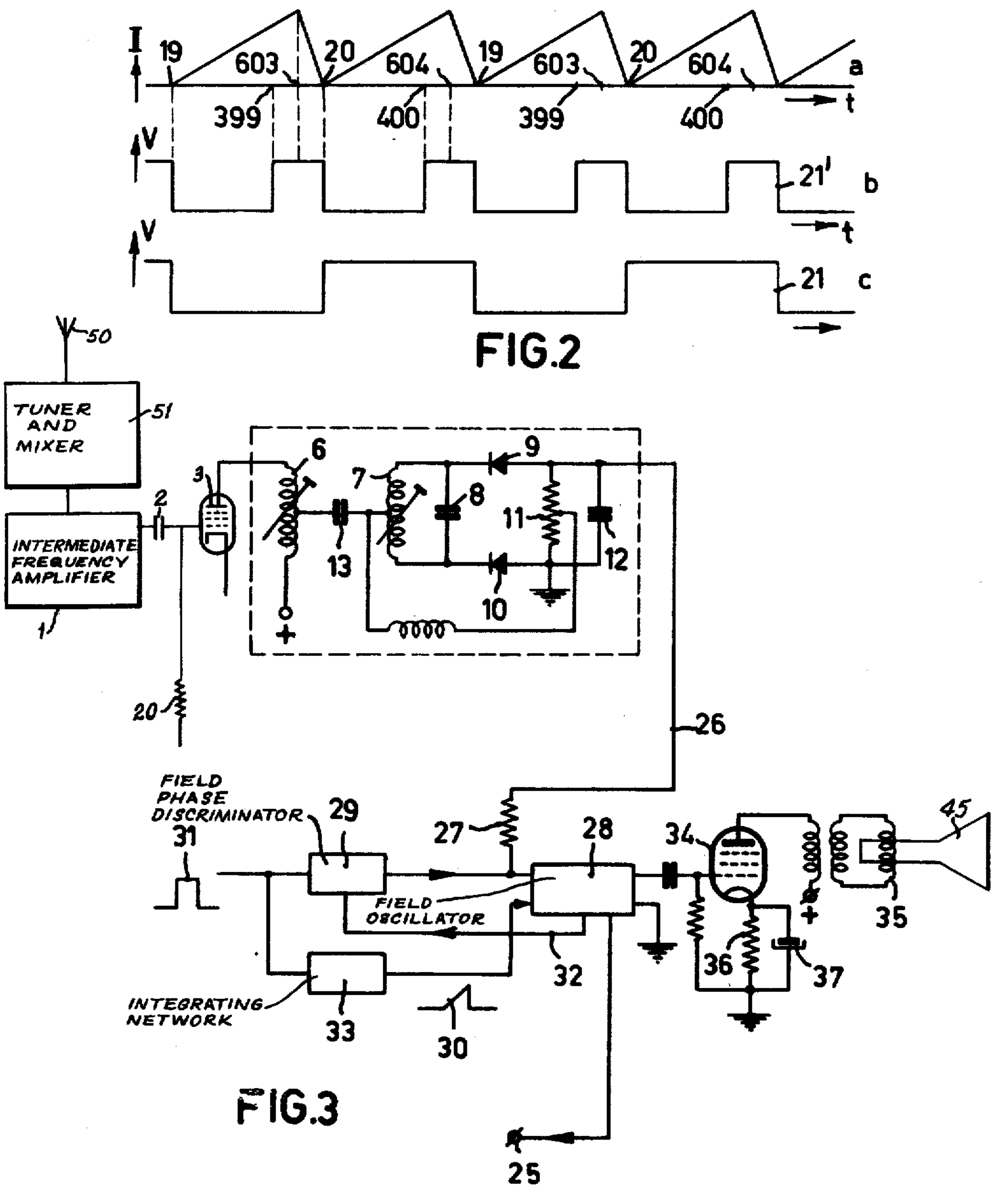
Figure 4:
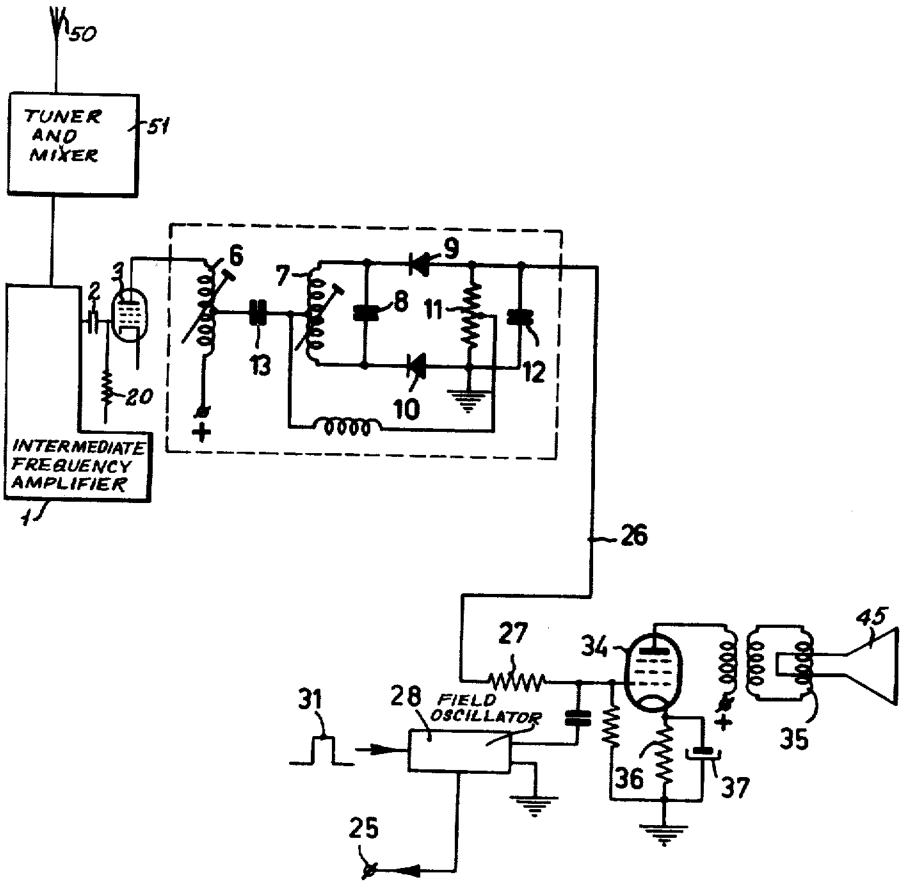

Some possible embodiments of circuit arrangements to be used in a receiver according to the invention will now be described by way of example with reference to the accompanying drawings, in which:

FIGURE 1 is an embodiment in which the phase of a line deflection oscillation is varied with respect to the line synchronising pulses by means of the tuning-dependent control signal, FIGURE 2 serves to illustrate the operation of the embodiment shown in FIGURE 1, FIGURE 3 is an embodiment in which the phase of the vertical deflection oscillation is varied with respect to the field picture synchronising pulses, and FIGURE 4 is an embodiment in which the amplitude of the vertical deflection oscillation is varied.

Referring now to FIG. 1, television signals modulated on a carrier are received by an antenna 50 and applied to a tunable input stage 51 of a television receiver. The input stage 51 may comprise a radio frequency amplifier and mixer, the output of which is connected to an intermediate frequency amplifier 1. The intermediate frequency signal having the frequency of picture or sound carrier waves is supplied, by way of coupling capacitor 2, to an amplifier tube 3 which may be constructed as a pentode. In the cathode circuit of the tube 3 a network is included comprising a capacitor 4 and a resistor 5 for supplying the required bias voltage. In the anode lead, the primary winding 6 of a frequency discriminator known per se is connected, the secondary winding 7 of which is tuned by means of a capacitor 8 and is connected to the cathode of two diodes 9 and 10. The anodes of the diodes 9 and 10 are connected together by the parallel combination of a resistor 11 and a capacitor

12. Between the tapping of the magnetically coupled windings 6 and 7, a coupling capacitor 13 is connected, so that in known manner and in accordance with the frequency of the intermediate frequency signal, alternating voltages having mutually different amplitude occur at the cathodes of the diodes 9 and 10. The anode of the diode 10 is grounded and at the anode of the diode 9 a detuning voltage occurs which, in the case of the exact tuning of the receiver is 0 volt and in the case of detuning to the one side or to the other assumes positive and negative values respectively. The detuning voltage is supplied to the line phase discriminator 15. In this discriminator, the line synchronising pulses 16 received are compared in known manner with the fly-back pulses 17 of the line deflection circuit arrangement in the receiver received from a source 43 of sawtooth deflection signals. The source 43 is connected in the conventional manner to the deflection system 44 of an image reproducing device 45. The control voltage produced by the line phase discriminator 15 is used for readjusting the line oscillator in the deflection signal source. This control voltage keeps the frequencies of line synchronising signals and line deflection oscillations exactly equal but permits definite phase shifts between the two signals. If the detuning voltage is supplied to this phase discriminator, a detuning of the line oscillator occurs which results in a phase variation between the line synchronising signal and the line deflection oscillation produced by the line oscillator. This phase variation consequently is a measure of the detuning. The circuit arrangement described so far would give a shift of the entire picture in accordance with the detuning.

In order to be able to shift, in accordance with the invention, successive parts of the picture differently strongly, a square gating voltage, indicated by 21, in addition to the intermediate frequency signal, is supplied, via a coupling resistor 20, to the control grid of the tube 3, which gating voltage periodically cuts off the tube 3 for the duration of a field and then renders the tube 3 operative for the duration of the following field frame. The gating voltage 21 is produced by means of a relaxation generator 22 known per se and has half the field frequency. In the embodiment shown, the duration of the positive pulses in the signal 21 equals that of the negative going ones. The relaxation generator constructed as a multivibrator is controlled by pulses derived from the field deflection portion of the deflection signal source and supplied to the terminal 25 and consequently serves as a circuit arrangement dividing by two. The signal derived from 22 is supplied to a terminal of the said coupling resistor 20 via the coupling capacitor 23 and the leakage resistor 24.

Owing to the action of the gating voltage 21, the frequency discriminator connected to the anode of the tube 3 is operative during each second field only. So the detuning voltage also occurs in each second field only and consequently only each second field is shifted if the receiver is not tuned correctly.

In the case of detuning, the contours of the two frames on the picture screen diverge and broken boundary lines occur. By readjusting the tuning, the detuning may be reduced to zero. In this case, the frequency discriminator no longer supplies a control signal and the second field is no longer shifted with respect to the first. Since the contours remain clearly visible also in the living pictures, respectively since a shift of the frames mutually is visible as lack of definition of the boundary lines, a sharply observable tuning indication is obtained.

If, for example, start is made from a wrong tuning and if detuning is carried out into the correct direction, the lack of definition becomes smaller and smaller until it has disappeared entirely. In the case of a further detuning, the lack of definition again increases. So it is clearly observed when the exact tuning is reached. This is still promoted in that when shifting the frames a flicker effect appears. This is to be explained by the fact that, when shifting the frames mutually, the frequency of each part of the picture of 25 c./s. becomes clearly visible. This effect consequently clearly supports the characterisation of the exact tuning with respect to the wrong tuning.

It may be of advantage to cut off the tube 3 longer than corresponds to the duration of a field. The blocking may be for example 170% to 190% of one field period. In this case, the frequency discriminator is operative only during a part of a field period so that also only this part is shifted by the detuning voltage. This part may be arranged so that it appears at the upper or lower edge of the picture. In this zone, the contour shifting in behalf of the tuning indication may be observed, while the rest of the picture is reproduced undistorted.

It is naturally not necessary to shift each second field with respect to each first. It is also possible to shift a part of the picture with respect to another part. For example, the multivibrator 22 may be caused to supply a signal 21 having the field frequency instead of half the frame frequency, the duration of the positive going pulses of which is chosen so, however, as to render the tube 3 operative only during a part of each field.

This is shown in FIGURE 2. FIGURE 2*a* shows the sawtooth current through the vertical deflection coils. The numerals in this figure indicate the numbers of the lines which are scanned during the field associated with one sawtooth period. In FIGURE 2*a*, the odd lines are written during the first sawtooth period, the even lines during the second period, the odd lines again during the third period, etc. etc. In this case it it assumed that during each field fly-back approximately 20 lines are not scanned since the electron beam in the picture tube is suppressed during this fly-back. So these lines serve no purpose for the tuning indication.

If the signal 21' shown in FIGURE 2*b* which originates from a somewhat modified multivibrator 22 is arranged so that the tube 3 is rendered operative from the instant at which for example the 399th line is scanned to the instant at which the fly-back is finished, is then rendered operative again from the instant at which the 400th line is scanned to the instant at which the second fly-back is finished etc., each time the lines 399–604 inclusive visible for the eye are shifted with respect to the lines 19–398 inclusive. In other words, the whole lower part of the picture is shifted with respect to the upper part, at least if the receiver is not tuned correctly. If the receiver is tuned correctly, the frequency discriminator does not supply a control signal and the lower part of the picture is not shifted with respect to the upper part.

For clearness sake, FIGURE 2*c* shows the signal 21 by which half picture shifting occurs. It goes explicitly forward that in this case the lines of the even field are shifted with respect to those of the odd field. From a comparison of the FIGURES 2*a*, 2*b* and 2*c* it appears that the frequency of the signal shown in FIGURE 2*b* equals that of the field sawtooth and that of the signal shown in FIGURE 2*c* has half the field frequency.

Finally it is also possible to shift other parts of the picture. For example, in addition to the visible lines 399–604 inclusive, also the lines 101–300 inclusive could be shifted. For that purpose, the tube 3 would have to be rendered operative also during the scanning of the odd lines 101–299 inclusive and during scanning of the even lines 102–300 inclusive. The signal 21' should then have the threefold half field frequency. In general, the frequency of the signal supplied by the generator 22 should be the ½ *n*-fold ($n=1, 2, 3$, etc.) of the field frequency.

The signal shown in FIGURE 2*b* may for example be produced in a simple manner by constructing the multivibrator 22 as a monostable relaxation generator instead of as a dividing circuit. This generator is trig- inclusive (this time equals that required to scan the even gered each time by the fly-back pulses of the field sawtooth signal. The time during which this monostable generator remains in its unstable state should be smaller than one period of a field sawtooth and corresponds for example to the time required to scan the odd lines 19–399 inclusive (this time equals that required to scan the even lines 20–400 inclusive). The trailing edges of the positive going pulses from the signal 21' (FIGURE 2*b*) will in this case not coincide with the end of the fly-back of the signal shown in FIGURE 2*a*. This is irrelevant, since the lines during this fly-back are not visible all the same. A signal having a higher frequency than that of the signal shown in FIGURE 2*b* may be obtained by supplying a signal, which has half the field frequency and which may be derived for example with a circuit arrangement dividing by two from the field frequency supplied to the terminal 25, to a multiplier circuit known per se.

The detuning voltage of the frequency discriminator need not always be supplied to the line oscillator via the line phase discriminator 15, but may also be supplied directly. This has the advantage that the shifting of the fields is effected more rapidly. For, in this case the inertia of the smoothing network connected to the line phase discriminator, the time constant of which network is many times larger than that of the network 11, 12, exerts no influence on the variations caused by the detuning voltage.

A second embodiment is shown in FIGURE 3. In this case, the detuning voltage derived from the frequency discriminator is supplied to the field oscillator 28 via the lead 26 and the separating resistor 27. This field oscillator is indirectly synchronised by means of a control voltage derived from the field phase discriminator 29 and synchronised directly by means of integrated frame synchronising pulses 30.

In order to realise all this, the square field synchronising pulses 31 for the indirect synchronisation are supplied to the field phase discriminator 29 and compared therein with the oscillator signal supplied via the lead 32.

The pulses 31 are integrated in the integrating network 33 so that at the output thereof the pulses 30 become available for direct synchronisation. As will be clear, the pulses which serve for controlling the multivibrator 22 and which are supplied via the terminal 25 are derived from the field oscillator 28.

Addition of the detuning voltage to the control voltage for the discriminator 29 again results in a phase variation between the synchronising signal 31 and the control signal for the field output tube 34 derived from the oscillator 28 which supplies the required current, as a result of which a sawtooth current having field frequency starts flowing through the vertical deflection coils 35.

In the case of wrong tuning, each second field is shifted in vertical direction with respect to each first field since the phase variation occurs again only during each second field.

It is still noted, that the detuning voltage has to be supplied directly to the field oscillator 28 and not via the frame phase discriminator 29, since the time constant of the smoothing network associated with the phase discriminator 29 is very large (even much larger than the time constant of the smoothing network associated with the line phase discriminator 15). A detuning voltage supplied via the discriminator 29 would consequently operate far too slowly.

If the field oscillator 28 is synchronised directly by the field synchronising signal 31, no field phase discriminator 29 is present. So it is not possible to vary the phase of the field deflection oscillation with respect to the field synchronising signal. In that case as shown in FIG. 4 the detuning voltage may be supplied directly by way of resistor 27 to the control grid of the field output tube 34. If the receiver is not detuned, the negative bias voltage for the tube 34, which is obtained by means of the cathode resistor 36 and the decoupling capacitor 37, is not varied. Consequently, a sawtooth current having the desired amplitude flows through the vertical deflection coils 35.

On the other hand, if the receiver is detuned, the frequency discriminator may supply either a positive or a negative detuning voltage during each second field, which voltage is added to the negative bias voltage for the tube 34. In the case of a negative detuning voltage, the amplitude of the sawtooth current through the coils 35 is reduced during each second field with respect to that during each first field. Each second field is consequently shrunk in a vertical direction with respect to each first field.

In the case of a positive detuning voltage, the reverse is the case and each second field is extended with respect to each first field. In the case of correct tuning the extension and shrinkage respectively does no longer occur, so that again a correct indication is available for reaching the correct tuning.

In the foregoing description concerning the embodiments shown in FIGURES 3 and 4 it has been assumed so far that the signal supplied to the tube 3 has a shape as shown in FIGURE 2*c*. In the case of FIGURE 4, the duration of the positive going pulses 21 may be reduced, however. Each second field is then extended and shrunk respectively during a part of its occurrence when the receiver is not tuned correctly.

It will be clear that any desired combination of the embodiments shown in FIGURES 1, 2 and 3 may be used.

What is claimed is:

1. Means for indicating the tuning of a television receiver having an image reproducing device, a source of modulated carrier signals, and a source of sawtooth deflection oscillations for said image reproducing device, said means comprising frequency discriminator means, gate means, means for applying said modulated carrier signals to said discriminator means by way of said gate means to provide a control voltage in said discriminator means dependent upon the tuning of said receiver, means applying said control voltage to said source of oscillations to displace the image on said image reproducing device, a source of a pulsatory signal having a frequency equal to $$\frac{n}{2}$$

times the field frequency of images on said image reproducing device, wherein $n$ is an integer, and means for applying said pulsatory signal to said discriminator means for periodically blocking the application of said modulated carrier signals to said discriminator means, whereby a portion of the image on said reproducing device is physically displaced with respect to another portion of said image when said receiver is incorrectly tuned.

2. The tuning indicating means of claim 1 comprising means for varying the phase of said oscillations as a function of said control voltage.

3. The tuning indicating means of claim 1 comprising means for varying the amplitude of said oscillations as a function of said control voltage.

4. A modulated carrier receiver having an image reproduction device, a source of television signals, a source of line deflection oscillations and a source of field deflection oscillations, means for applying said television signals and line and field deflection oscillations to said reproducing device to produce an image, and means for displacing a portion of said image with respect to another portion thereof when said receiver is incorrectly tuned, said image displacing means comprising frequency discriminator means, gate means, means for applying said modulated carrier signals to said discriminator by way of said gate means, means to produce a control voltage in said discriminator means dependent upon the tuning of said receiver, means for applying said control voltage to said source of line oscillations to vary the phase of said line oscillations, means deriving a pulsatory signal from said source of field oscillations having a frequency signal equal to $$\frac{n}{2}$$

times the field frequency, wherein $n$ is an integer, and means for applying said pulsatory signal to said gate means to periodically block the application of said modulated carrier signals to said discriminator means.

5. The receiver of claim 4, wherein said means deriving said pulsatory signal comprises relaxation generation means for dividing the frequency of said field oscillations by two, so that said pulsatory signal has a frequency equal to one-half of said field frequency.

6. The receiver of claim 4 wherein said means deriving said pulsatory signal comprises a monostable relaxation generator having an unstable state with a duration less than the period of a field oscillation, and means for triggering said relaxation generator from said source of field deflection oscillations.

References Cited in the file of this patent

UNITED STATES PATENTS

| | | |
|---|---|---|
| 2,180,944 | Linsell | Nov. 21, 1939 |
| 2,904,630 | Bruch et al. | Sept. 15, 1959 |

UNITED STATES PATENT OFFICE

CERTIFICATE OF CORRECTION

Patent No. 3,123,669 March 3, 1964

Helmut Mehlhorn

It is hereby certified that error appears in the above numbered patent requiring correction and that the said Letters Patent should read as corrected below.

Column 6, line 13, for "modulated carrier" read -- television --; lines 14 and 16, for "television", each occurrence, read -- modulated carrier --.

Signed and sealed this 18th day of August 1964.

(SEAL)
Attest:

ERNEST W. SWIDER
Attesting Officer

EDWARD J. BRENNER
Commissioner of Patents